United States Patent
Breitweg et al.

[11] Patent Number: 5,571,238
[45] Date of Patent: Nov. 5, 1996

[54] CENTERING DEVICE, ESPECIALLY FOR STEERING VALVES

[75] Inventors: Werner Breitweg, Schwäbisch Gmünd, Germany; Hans Hofmann, Mögglingen, Germany

[73] Assignee: ZF Friedrichshafen AG, Friedrichshafen, Germany

[21] Appl. No.: 481,402

[22] Filed: Jul. 10, 1995

[30] Foreign Application Priority Data

Jan. 13, 1993 [DE] Germany ............................ 43 00 612.4

[51] Int. Cl.⁶ .................................................. F15B 9/10
[52] U.S. Cl. .................................. 91/375 A; 137/625.21; 180/417
[58] Field of Search ........................... 91/370, 375 R, 91/375 A; 137/625.21; 180/132

[56] References Cited

U.S. PATENT DOCUMENTS

| 4,774,847 | 10/1988 | Breitweg ........................... 91/375 A X |
| 5,046,574 | 9/1991 | Goodrich et al. ................ 91/375 A X |

FOREIGN PATENT DOCUMENTS

| 0468659 | 1/1992 | European Pat. Off. . |
| 2496583 | 6/1982 | France . |
| 2601638 | 1/1988 | France . |
| 3514325 | 10/1985 | Germany ............................ 91/375 A |
| 4235633 | 4/1994 | Germany ............................ 91/375 A |
| 2027399 | 2/1980 | United Kingdom ................. 91/375 R |
| 2044697 | 10/1980 | United Kingdom . |
| 2212463 | 7/1989 | United Kingdom . |
| 9400329 | 1/1994 | WIPO . |

*Primary Examiner*—Hoang Nguyen
*Attorney, Agent, or Firm*—Larson & Taylor

[57] ABSTRACT

A centering device for steering valves which includes a rotary rod (1) that is firmly connected at an endpiece (1A) with a drive shaft (3) and at another endpiece (1B) with a power takeoff shaft (4). Fine-centering is provided because rotary rod (1) cannot establish any exact mid-way centering between a rotary slide (3A) and a valve bushing (6). The fine-centering device consists of a tube-shaped endpiece (7) that is attached to the drive shaft and that bears a metal bellows (8) and a centering piece (10) that is connected with the bellows. Centering piece (10) is axially prestressed by metal bellows (8) and, via roller bodies (12) presses against another centering piece (14). Centering piece (14) is part of a bearing race (15) of a needle bearing (16) that is pressed upon the endpiece (1B) of rotary rod (2), the endpiece (1B) being connected to the power takeoff shaft (3). The centering pieces (10, 14) are provided with oblique-surface grooves (11, 13) that—when the two shafts (3, 4) are twisted toward each other—generate a centering force via the roller body.

3 Claims, 2 Drawing Sheets

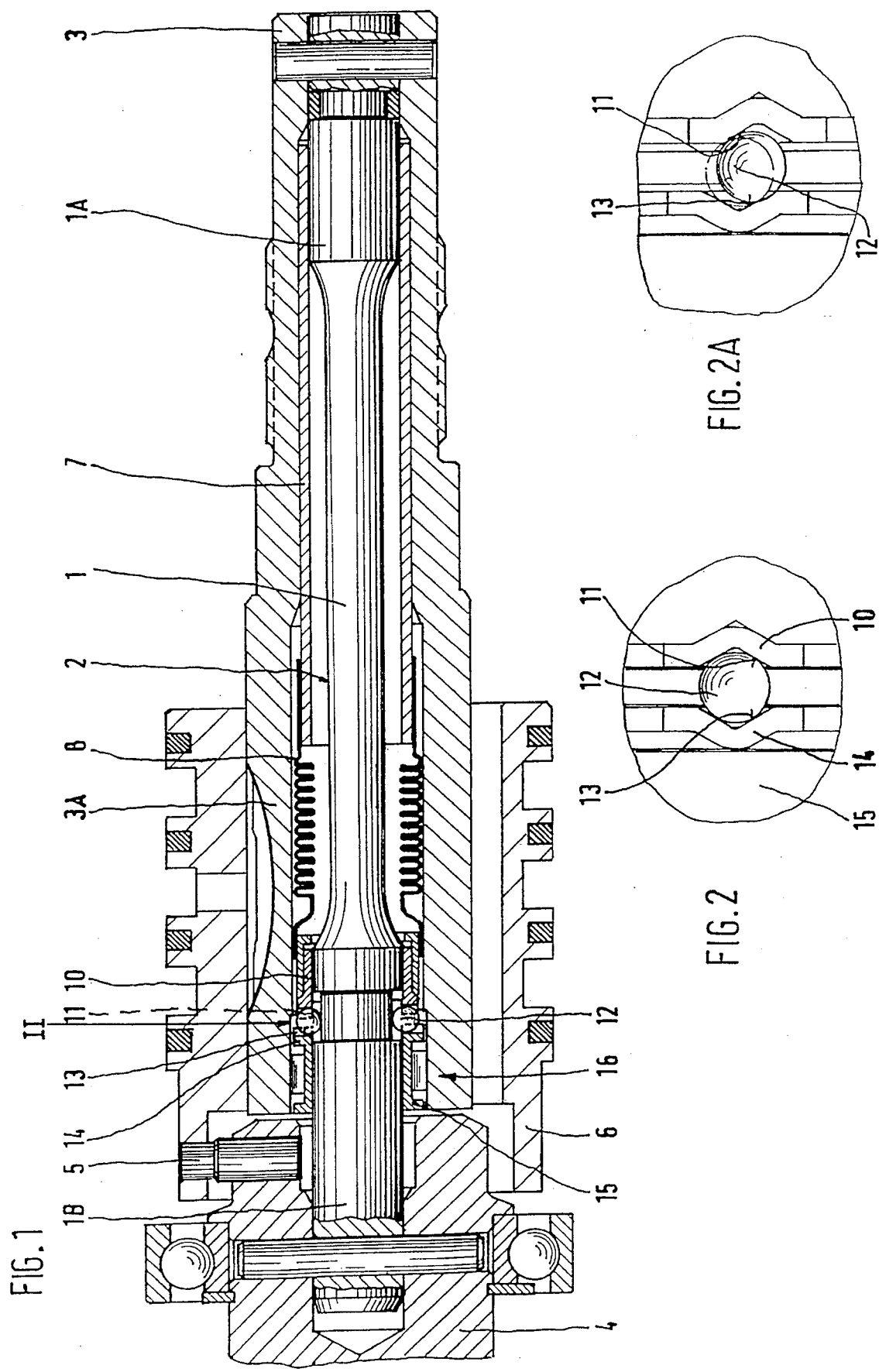

CENTERING DEVICE, ESPECIALLY FOR STEERING VALVES

This invention relates to a centering device, especially for steering values of motor vehicles, according to the preamble of the first claim.

A drive shaft is provided in such steering gears, and this drive shaft is connected with a power takeoff shaft by a rotary rod that is provided with bilateral endpieces. The drive shaft and the power takeoff shaft carry mutually cooperating parts of the steering valve which—by means of a relative location of the drive shaft with respect to the power takeoff shaft—triggers a pressure in a servomotor. The centering device is arranged between the two shafts and has roller bodies that run up upon the mutual opposite oblique surfaces of two centering pieces against the force of a spring element.

A centering device featuring this design (EP 0 244 449) contains a metal bellows [shock absorber] as spring element. The metal bellows is connected, on the one hand, by an endpiece of the rotary rod that is attached to the drive shaft and, on the other hand, it is connected to a centering piece. The centering piece—which is axially spring-loaded by the metal bellows—presses via the roller bodies against another centering piece that is attached to one endpiece. This endpiece connects the rotary rod to the power takeoff shaft. The roller bodies roll off in oblique-surface grooves; this is why one gets a restoring force that depends on the relative rotation of the two shafts and that is added to twisting force of the rotary rod. A centering device, thus structured, assumes the exact setting of the two shafts and plus also of the steering valve in the hydraulic center. The known centering device is suitable for steering valves in the rotary slide design or in the rotary piston design and ensures perfect straight-ahead driving behavior.

The object of the invention is to create a mid-centering device that—in combination with an undivided or a tripartite rotary rod—will stress the axial structural space even less.

This problem is solved by the centering device characterized in claim 1. Claims 2 and 3 contain advantageous embodiments.

According to the invention, a rotary slide valve is provided as steering valve; the rotary slide of the rotary slide valve is braced via a needle bearing upon the endpiece of the rotary rod, said endpiece being connected with the power takeoff shaft. Upon an inside bearing race of the needle bearing, there is molded a centering piece that is opposite the centering piece that is connected to the drive shaft via the other endpiece. In this way, one can use the needle bearing's bushing—that is fixed upon the endpiece on the power takeoff side—simultaneously as carrier for the centering piece so that the structural length of the centering device is shortened.

According to claim 2 in case of an undivided rotary rod, there adjoin endpieces in the torsion area of the rotary rod whose cross-section is reduced, said endpieces being connected with the drive shaft and the power takeoff shaft; the needle bearing sits on the endpiece that is fastened [together] with the power takeoff shaft.

According to claim 3, one can further shorten the structural length when one uses a tripartite rotary rod. A tripartite rotary rod has two endpieces that extend in sleeve-fashion into the torsion area of the rotary rod. In this embodiment, the needle bearing sits on the rotary rod's sleeve-like endpiece that is connected to the power shaft so that no additional axial installation space is needed for the bearing [positioning] with integrated centering piece and the adjoining other parts of the centering device.

A steering valve, executed in the rotary slide design, where the rotary slide is placed via a needle bearing upon the power takeoff side projection of the rotary rod, is already known from EP 0 290 448 B1. But this steering valve is not equipped with a centering device that ensures the exact setting of the rotary slide valve in the hydraulic center.

The invention will be described below in greater detail with the help of two practical examples illustrated in the drawing. Here:

FIG. 1 is a longitudinal profile with a rotary slide valve with an undivided rotary rod;

FIG. 2 is a top view in the direction of arrow II in FIG. 1;

FIG. 2A shows the centering device according to FIG. 2, but in the working position.

Figure 3:
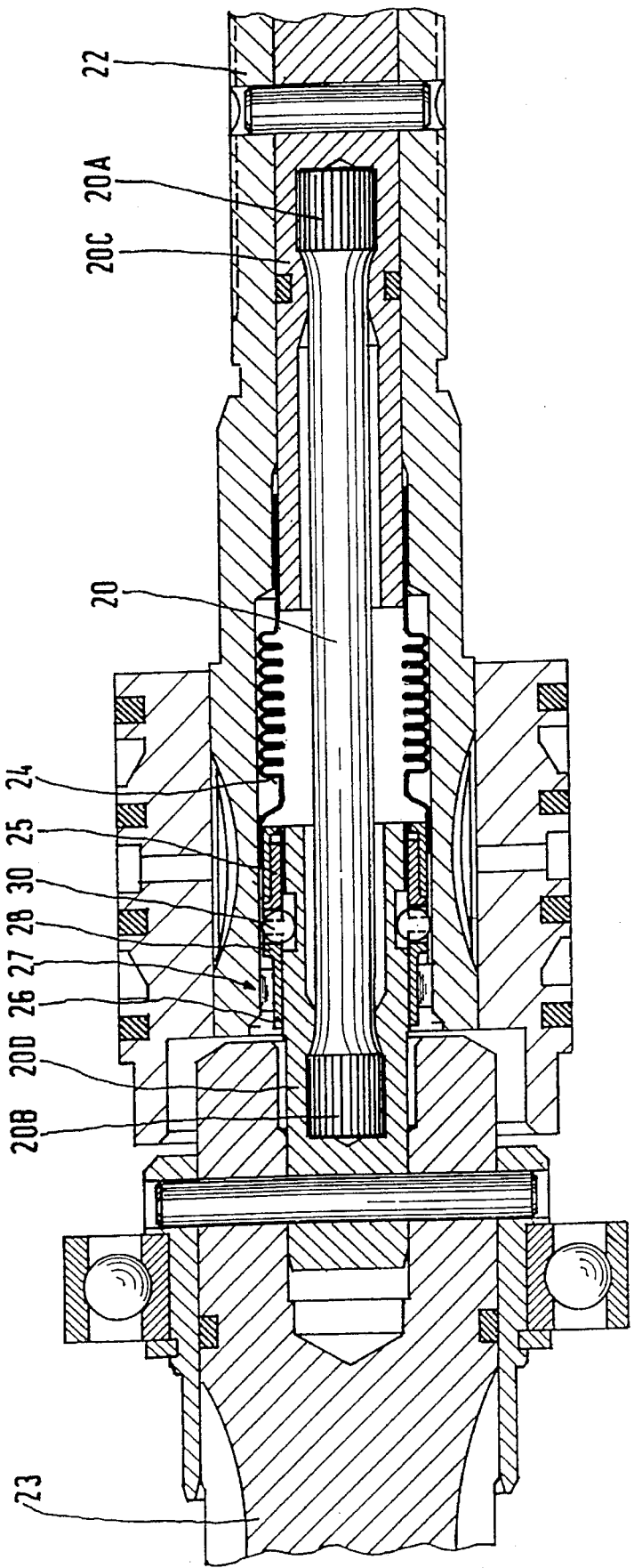
FIG. 3 is an exemplary embodiment with a tripartite rotary rod.

The centering device according to FIG. 1 has an undivided rotary rod 1 with thickened endpieces 1A and 1B adjoining the rotary rod's torsion area 2 whose cross-section is reamed. Endpiece 1A is pinned together with a drive shaft 3 and endpiece 1B is pinned together with power takeoff shaft 4. Drive shaft 3 has a rotary slide 3A in its extension. Adjoining power takeoff shaft 4, there is a valve bushing 6 that is coupled together with the power takeoff shaft by a pin 5 in which rotary slide 3A can perform a relative rotation to trigger a pressure. Rotary slide 3A and valve bushing 6 in the known manner form a rotary slide valve that, via a control groove system, pipes pressurized oil to a servomotor, not illustrated. The centering device includes a tube-shaped endpiece 7 that is attached to drive shaft 3 and that bears a metal bellows 8 serving as spring element. Attached to metal bellows 8 in its axial extension is a first centering piece 10. The centering piece 10 has two diametrically opposite oblique-surface grooves 11 (FIGS. 2 and 3) in which roller bodies 12 roll off. Roller bodies 12 are supported—stressing the metal bellows 8—in oblique-surface grooves 13 of a second centering piece 14 that, according to the invention, is at the same time made as the bearing race 15 of a needle bearing 16. Roller bodies 12 keep the friction between oblique-surface grooves 11 and 13 low. Needle bearing 16 is pressed upon endpiece 1B of rotary rod 1 and ensures minimum friction, plus sensitive response of rotary slide valve 3A, 6 as drive shaft 3 is rotated.

FIG. 2 shows the centering device and thus also rotary slide valve 3A, 6 in the mid-position or the neutral position. FIG. 2A, on the other hand, shows the torsion position of drive shaft 3 with respect to power takeoff shaft 4. Two mutually opposite oblique surfaces of the oblique-surface grooves 11 and 13 move toward each other, while the roller bodies 12 run up—out of their resting position (FIG. 2)—upon the oblique surfaces (FIG. 2A). As a result, metal bellows 8 is even more strongly prestressed. Via the oblique surfaces, one can convert the axial restoring force into a centering force that works in the circumferential direction of rotary slide 3A and of valve bushing 6. When a manual steering wheel, coupled together with drive shaft 3, is let go, this centering force ensures the exact mid-way position of rotary slide valve 3A, 6.

FIG. 3 shows a so-called design of a rotary slide valve with a rotary rod 20. The latter bears endpieces 20C and 20D in the form of sleeve-shaped projections, said endpieces being kneaded upon supporting areas 20A and 20B. Such a rotary rod, therefore, consists of three parts. Endpiece 20C is pinned together with a drive shaft 22 and endpiece 20D is pinned together with a power takeoff shaft 23. Endpiece 20C again bears a metal bellows 24, and the latter bears a first centering piece 25. According to the embodiment in FIG. 1, a bearing race 26 of a needle bearing 27 again forms one structural unit with a second centering piece 28, while roller bodies 30 roll off between oblique-surface grooves. The special feature of this embodiment consists in the fact that the bearing race 26 is pressed upon the endpiece 20D of rotary rod 20. Needle bearing 27 is here moved over the torsion area of the rotary rod so that one can retain the short design.

References
1 Rotary rod
1A Endpiece
1B Endpiece
2 Torsion area
3 Drive shaft
3A Rotary slide
4 Power takeoff shaft
5 Pin
6 Valve bushing
7 Endpiece
8 Metal bellows
9 —
10 Centering piece
11 Oblique-surface grooves
12 Roller bodies
13 Oblique-surface grooves
14 Centering piece
15 Bearing race
16 Needle bearing
20 Rotary rod
20A Supporting area
20B Supporting area
20C Endpiece
20D Endpiece
22 Drive shaft
23 Power takeoff shaft
24 Metal bellows
25 Centering piece
26 Bearing race
27 Needle bearing
28 Centering piece
29 —
30 Roller bodies

We claim
1. A centering device for steering valves in motor vehicles which comprises:

a rotary rod provided with first and second endpieces at first and second ends of the rotary rod, respectively;

a drive shaft connected with the first endpiece at a first end of the rotary rod;

a power takeoff shaft connected with the second endpiece at the second end of the rotary rod;

the driveshaft and the power takeoff shaft bearing mutual cooperating parts of the steering valve;

the centering device being arranged between the two shafts and consisting of two centering pieces provided with opposing oblique surfaces and roller bodies that are biased against with the oblique surfaces of the centering pieces by a spring element, and the first centering piece being connected to the drive shaft by a tube-shaped endpiece;

a rotary slide which is adjustable in relation to a valve bushing, which rotary slide is provided as a steering valve;

the rotary slide being supported by a needle bearing located on the endpiece of the rotary rod which is connected to the drive shaft;

and the second centering piece being formed integrally with a bearing race of the needle bearing.

2. A centering device as claimed in claim 1 wherein the rotary rod is a unitary member and the endpieces adjoin a torsion area of the rotary rod which has a reduced cross-section with respect to the cross-section of the remaining portion of the rotary rod; and the needle bearing fits on the endpiece of the rotary rod which is attached to the power takeoff shaft.

3. A centering device as claimed in claim 1 wherein the two endpieces of the rotary rod are in the form of sleeve-shaped projections; and the needle bearing sits on the sleeve-shaped endpiece which is connected to the power takeoff shaft.

\* \* \* \* \*